United States Patent [19]

Katsumata et al.

[11] 4,072,945
[45] Feb. 7, 1978

[54] RADAR-OPERATED COLLISION AVOIDANCE SYSTEM FOR ROADWAY VEHICLES USING STORED INFORMATION FOR DETERMINATION OF VALID OBJECTS

[75] Inventors: Masaaki Katsumata; Norio Fujiki, both of Yokohama, Japan

[73] Assignee: Nissan Motor Company, Limited, Yokohama, Japan

[21] Appl. No.: 746,742

[22] Filed: Dec. 2, 1976

[30] Foreign Application Priority Data

Dec. 2, 1975 Japan .................................. 50-142376

[51] Int. Cl.² ........................... G01S 9/02; B60T 17/18
[52] U.S. Cl. ................................................. 343/7 VM
[58] Field of Search ............................ 343/7 VM, 7

[56] References Cited

U.S. PATENT DOCUMENTS

| 4,011,563 | 3/1977 | Robbi | 343/7 VM |
|---|---|---|---|
| 4,016,566 | 4/1977 | Fujiki | 343/7 VM |

Primary Examiner—T.H. Tubbesing
Attorney, Agent, or Firm—Richard L. Schwaab

[57] ABSTRACT

A radar-operated collision avoidance system for a roadway vehicle comprises a radar device for sensing the vehicle speed relative to an object and its distance thereto to decide whether the vehicle is approaching the object at a dangerously high speed. A minimum allowable distance represented by a digital code is stored in a memory location within an array of rows and columns and read out in response to a sensed vehicle speed relative to the roadway and to a sensed magnitude of steering movement. The minimum allowable distance is compared with the distance sensed by the radar to determine that the decision is valid only when the latter is smaller than the former.

5 Claims, 5 Drawing Figures

Fig. 2
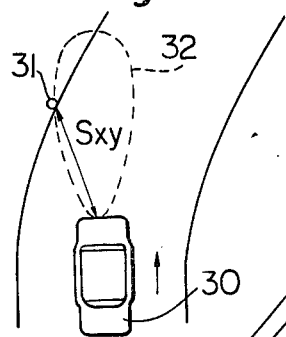
Fig. 3
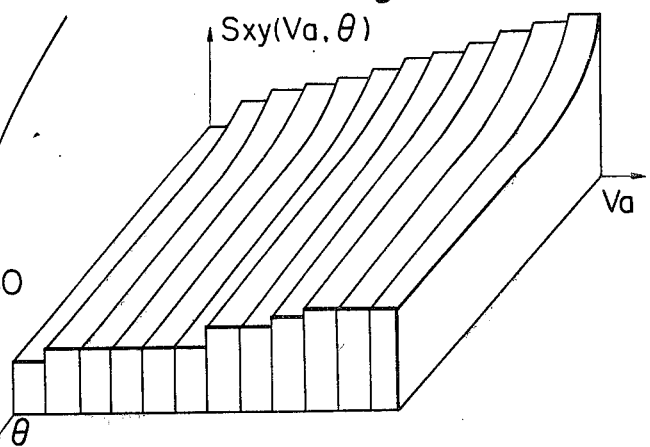
Fig. 4
| X | | 1 | 2 | 3 | 4 | 5 | 6 | 7 | 8 | 9 | 10 | 11 | 12 |
|---|---|---|---|---|---|---|---|---|---|---|---|---|---|
| Y | Va θ | 0~10 | 11~20 | 21~30 | 31~40 | 41~50 | 51~60 | 61~70 | 71~80 | 81~90 | 91~100 | 101~110 | 111~120 |
| 1 | 0~2 | 10 | 16 | 17 | 19 | 21 | 23 | 25 | 27 | 29 | 31 | 33 | 35 |
| 2 | 3~4 | 10 | 15 | 16 | 18 | 19 | 22 | 23 | 25 | 26 | 28 | 30 | 34 |
| 3 | 5~6 | 10 | 15 | 15 | 17 | 18 | 22 | 23 | 24 | 25 | 27 | 28 | 29 |
| 4 | 7~8 | 10 | 15 | 15 | 17 | 17 | 21 | 22 | 23 | 24 | 26 | 27 | 28 |
| 5 | 9~10 | 10 | 15 | 15 | 16 | 17 | 20 | 21 | 22 | 23 | 25 | 26 | 27 |
| 6 | 11~12 | 10 | 15 | 15 | 16 | 16 | 18 | 20 | 21 | 23 | 24 | 25 | 26 |
| 7 | 13~14 | 10 | 15 | 15 | 16 | 16 | 18 | 20 | 20 | 22 | 23 | 24 | 24 |
| 8 | 15~16 | 10 | 15 | 15 | 16 | 16 | 17 | 20 | 20 | 22 | 23 | 24 | 24 |
| 9 | 17~18 | 10 | 15 | 15 | 16 | 16 | 16 | 19 | 20 | 21 | 22 | 22 | 23 |
| 10 | 19~20 | 10 | 15 | 15 | 16 | 16 | 16 | 19 | 19 | 20 | 22 | 22 | 22 |

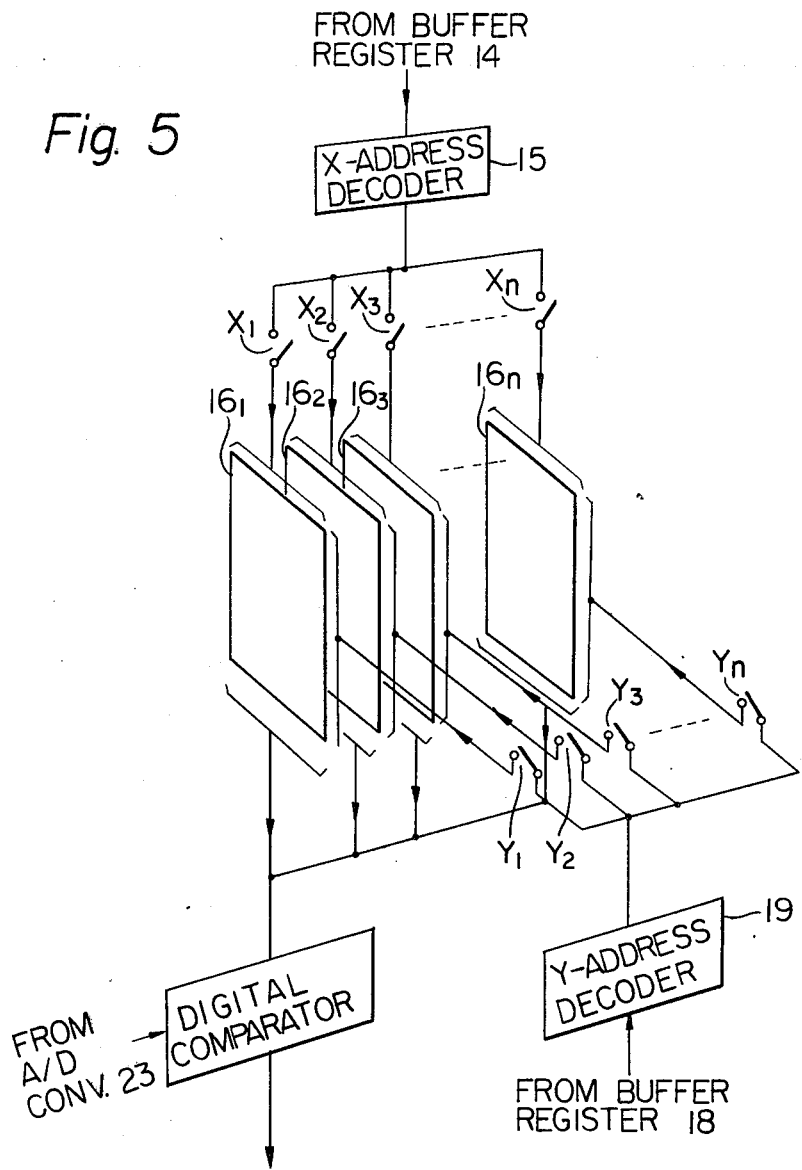

RADAR-OPERATED COLLISION AVOIDANCE SYSTEM FOR ROADWAY VEHICLES USING STORED INFORMATION FOR DETERMINATION OF VALID OBJECTS

BACKGROUND OF THE INVENTION

The present invention relates generally to radar-operated collision avoidance systems for roadway vehicles, and particularly to an improvement to such systems in which danger indicating signals are given only when the vehicle encounters a valid object.

In prior art radar-operated collision avoidance systems, it is often experienced that false signals are generated when the vehicle encounters a curved roadway along which objects such as signposts, lampposts or guard rails are located, since the transmitted radar beam is reflected from such objects while the driver is steering the vehicle along the curves. If the driver encounters a series of such curves along the roadway, false signals will be given in succession due to the presence of such invalid objects.

SUMMARY OF THE INVENTION

The primary object of the present invention is therefore to provide a radar-operated collision avoidance system in which signals are given only when valid objects are encountered.

Briefly described, the collision avoidance system includes a radar device which detects the speed of the vehicle relative to an object and the distance from the vehicle thereto, and a decision making circuit which determines whether the vehicle is approaching the object at a dangerously high speed that justifies the generation of a signal to provide necessary action, such as alerting the driver or operating the brake. According to the invention, a minimum allowable distance is set up by a set of external conditions such as human factors of the driver and roadway and weather conditions as a function of two input variables such as the speed of the vehicle relative to roadway and the angle of steering movement, and represented by a digital code and stored in a particular storage location of an array of rows and columns. Sensors are provided to detect the vehicle speed relative to the roadway and the steering angle in order to read out the stored information for comparison with the distance to the object detected by the radar device. The read out information permits the vehicle to approach the object as near as the minimum distance. When the detected distance is greater than the minimum distance, the signal from the decision making circuit is disabled, and only enabled to initiate necessary action when the former becomes smaller than the latter.

In accordance with a broader aspect of the invention, there is provided a collision avoidance system for a roadway vehicle having a steering wheel, including a radar device for sensing the distance from the vehicle to an object and the speed of the vehicle relative to the object, a decision making circuit responsive to the sensed distance and the relative speed to determine when the vehicle is approaching the object at a dangerously high speed, and a utilization circuit responsive to an output from the decision making circuit, wherein the invention is characterized by means for detecting the speed of the vehicle relative to roadway, means for detecting the magnitude of angular movement of the steering wheel, means for storing information representing a minimum allowable distance from the vehicle to the object for a set of input variables, means for reading the stored information in response to the detected vehicle speed and to the detected magnitude of angular movement of the steering wheel as a set of said input variables, means for comparing the distance sensed by the radar device and the minimum allowable distance represented by the information read out from the storing means to generate an inhibit signal when the sensed distance is greater than the allowable distance, and means for disabling the output signal from the decision making circuit in response to the inhibit signal.

In accordance with a second, narrower aspect of the invention, there is provided a collision avoidance system for a roadway vehicle having a steering wheel, including a radar device for sensing the distance from the vehicle to an object and the speed of the vehicle relative to the object, a decision making circuit responsive to the sensed distance and the sensed relative speed to determine when the vehicle is approaching the object at a dangerously high speed, and a utilization circuit responsive to an output from the decision making circuit, wherein the invention is characterized by means for detecting the speed of the vehicle relative to roadway, means for detecting the magnitude of angular movement of the steering wheel, a plurality of memory matrices each storing information representing a minimum allowable distance from the vehicle to the object for a particular set of input variables within an array of rows and columns, means for selectively reading the stored information from one of the memory matrices in response to the detected vehicle speed and to the detected magnitude of angular movement of the steering wheel as a set of the input variables, means for comparing the distance sensed by the radar device and the minimum allowable distance represented by the information read out from said one of the memory matrices to generate an inhibit signal when the sensed distance is greater than the allowable distance, and means for disabling the output signal from the decision making circuit in response to the inhibit signal.

In accordance with a further aspect of the invention, there is provided a method for detecting a valid object from a roadway vehicle having a steering wheel, which comprises storing electrical quantities each representing a minimum allowable distance from the vehicle to an object for a given set of a speed of the vehicle relative to roadway and a magnitude of angular movement of the steering wheel in storage locations within an array of rows and columns, sensing the speed of the vehicle relative to the roadway, sensing the distance from the vehicle to the object, relating the sensed vehicle speed and the distance to a particular location of the array of rows and columns, addressing the storage location in response to the sensed vehicle speed and the sensed distance to read out the electrical quantity stored in the addressed location, sensing the speed of the vehicle relative to the object, determining whether the vehicle is approaching the object at a dangerously high speed in response to the sensed vehicle speed relative to the object and to the sensed distance, comparing the minimum allowable distance represented by the read out electrical quantity with the sensed distance, and judging that the determination is valid when the sensed distance is smaller than the minimum allowable distance.

BRIEF DESCRIPTION OF THE DRAWINGS

The invention will be further described with reference to the accompanying drawings, in which:

FIG. 2 is an illustration useful for describing the operation of the invention;

FIG. 3 is an ordinate representation of a rangecut function which defines the minimum allowable distance in the vertical axis as a function of input variables in horizontal axes;

FIG. 4 is an example of the contents of memory matrix used in the circuit of FIG. 1; and FIG. 5 is a modification of the embodiment of FIG. 1.

DETAILED DESCRIPTION OF PREFERRED EMBODIMENTS

Figure 1:
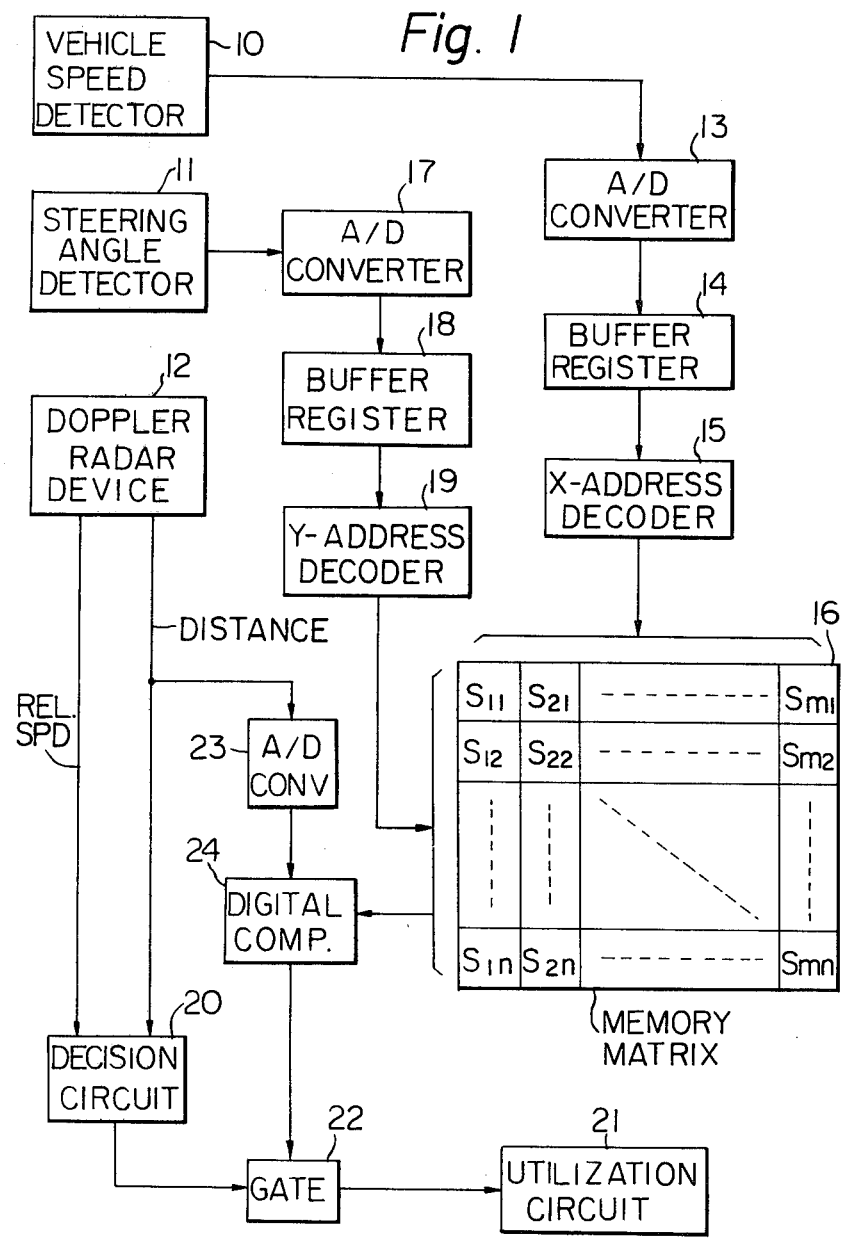
FIG. 1 is a schematic block diagram of an embodiment of the invention.

Referring now to FIG. 1, an embodiment of the present invention is shown as comprising a vehicle speed detector 10, a steering angle detector 11, and a Doppler radar device 12. The vehicle speed is sensed by the detector 10 and converted into a binary coded signal by an A/D converter 13 and stored in a buffer register 14. To the buffer register 14 is coupled an X-address decoder 15 which decodes the speed-representative binary code into a particular column of a memory matrix 16. The steering angle detector 11 generates an analog signal representative of the angle of steering wheel relative to the center position, which signal is converted into a binary coded signal by an A/D converter 17 and stored in a buffer register 18. The steering angle detector 11 may be of the type which generates a signal representative of the angle of steering column relative to the previous angular position. A Y-address decoder 19 translates the binary code stored in the register 18 into a particular row of the memory matrix to determine a particular location at the crosspoint of the X and Y addresses of the memory 16. Doppler radar device 12 delivers a signal representative of the vehicle speed relative to an object in front in a conventional manner and also delivers a range signal representative of the distance from the vehicle to the object in question. A decision circuit 20 receives the signals from the radar device and decides whether the formula $2\alpha R < V^2$ is satisfied, where $\alpha$ is a coefficient, R, the distance from the vehicle to the object, and V, the speed of the vehicle relative to the object in question. If the decision making formula is satisfied, the circuit 20 delivers an output to a utilization circuit or warning device 21 through a transmission gate 22. The distance representative signal from the radar device 12 is also converted into a binary coded signal by an A/D converter 23 and applied to a digital comparator 24 for comparison with a digital value received from a selected location of the memory matrix 16. When the digital value representing the distance measured by the radar device 12 is greater than the digital value stored in the selected memory location, the digital comparator 24 disables the gate 22 to prevent the output from the decision circuit 20 from operating the warning device 21.

The memory matrix 16 includes a matrix array of memory units each comprised by a set of memory cells, six in number for example, for representing the allowable minimum distance from a vehicle 30 in an object 31 situated within a detectable range as indicated by broken lines 32 in FIG. 2. The minimum allowable distance is determined by a number of human factors including the driver's age, sex, skill in driving, and the degree of alertness to external stimuli, and a number of external conditions such as weather conditions and roadway conditions (whether the road is asphalt-paved or concrete-paved) and hour of the day. The minimum allowable distance is expressed by range-cut function $S_{xy}(Va, \theta)$ which varies as a function of vehicle speed Va and the degree of steering angle $\theta$ (FIG. 3) which are supplied from the vehicle speed detector 10 and the steering angle detector 11, respectively. Therefore, there is a particular value of minimum allowable distance for a set of input variables Va and $\theta$, which are respectively allotted to the columns (X address lines) and the rows (Y address lines) in the memory matrix as indicated in FIG. 4. FIG. 4 shows an example the memory contents of the matrix 16 in which each memory location is given a numerical value in meters which is expressed in binary representation by the six memory cells of each memory unit which is accessible by a selected one of X address buses 1 to 12 and a selected one of Y address buses 1 to 10. The vehicle speeds Va ranging from 0 to 120 kilometers per hour are equally divided into 12 steps to corresponds to each of the X address buses 1 to 12, while the angular values of steering movement $\theta$ ranging from 0° to 20° are equally divided into 10 steps to correspond to each of the Y address buses 1 to 10.

Each memory location is addressed by the X and Y address decoders 15 and 19 and the memory contents in the addressed location are read out and applied to the digital comparator 24 as a minimum allowable limit for comparison with the output from the A/D converter 23. As previously described, if the distance from the vehicle 30 to the object 31 as detected by the radar device 12 is greater than the minimum distance represented by the information read out from the memory matrix 16, the comparator 24 generates no output so that gate 22 is disabled and no alarm is given. Therefore, the warning signal is given only when the detected range (D) is lower than the minimum allowable limit, so that false signals arising from roadway obstacles such as signposts, lampposts or guard rails which come into the detectable range of the radar device 12 when the vehicle follows a sharp turn, are disabled.

Since there is a particular set of minimum allowable distances for a set of particular human factors and roadway conditions, etc., it is advantageous to provide a memory matrix for each set of input conditions. FIG. 5 illustrates another example in which a plurality of memory matrices $16_1$, $16_2$ to $16_n$ is provided. A plurality of switches $X_1$ to $X_n$ selectively connects the output from the X-decoder 15 to a desired one of the memory matrices $16_1$ to $16_n$. Similarly, a plurality of switches $Y_1$ to $Y_n$ is provided to selectively connect the output from the Y-address decoder 19 to the desired memory matrix. The digital value stored in a given location of each matrix is different from that stored in the corresponding location of another matrix. The operation of a particular set of switches X and Y allows the X and Y address decoders to gain access to any desired memory matrix which is suitable for a particular set of external driving conditions.

What is claimed is:

1. A collision avoidance system for a roadway vehicle having a steering wheel, including a radar device for sensing the distance from the vehicle to an object and the speed of the vehicle relative to said object, a decision making circuit responsive to said sensed distance and said relative speed to determine when the vehicle is approaching the object to a dangerously high speed, and a utilization circuit responsive to an output from said decision making circuit, wherein the improvement comprises:

- means for detecting the speed of the vehicle relative to roadway;
- means for detecting the magnitude of angular movement of said steering wheel;
- means for storing information representing a minimum allowable distance from said vehicle to said object for a set of input variables;
- means for reading the stored information in response to said detected vehicle speed and to said detected magnitude of angular movement of said steering wheel as a set of said input variables;
- means for comparing the distance sensed by said radar device and the minimum allowable distance represented by the information read out from said storing means to generate an inhibit signal when said sensed distance is greater than said allowable distance; and
- means for disabling said output signal from said decision making circuit in response to said inhibit signal.

2. A collision avoidance system as claimed in claim 1, wherein said storing means comprises a plurality of memory units arranged in an array of rows and columns, and said reading means comprises first means for addressing one of the rows of said array in response to the detected vehicle speed and second means for addressing one of the columns of said array in response to the detected magnitude of angular movement of said steering wheel.

3. A collision avoidance system as claimed in claim 2, wherein each of said memory units comprises a plurality of memory cells for storing said minimum allowable distance in binary representation.

4. A collision avoidance system for a roadway vehicle having a steering wheel, including a radar device for sensing the distance from the vehicle to an object and the speed of the vehicle relative to said object, a decision making circuit responsive to said sensed distance and said sensed relative speed to determine when the vehicle is approaching the object at a dangerously high speed, and a utilization circuit responsive to an output from said decision making circuit, wherein the improvement comprises:

- means for detecting the speed of the vehicle relative to roadway;
- means for detecting the magnitude of angular movement of said steering wheel;
- a plurality of memory matrices each storing information representing a minimum allowable distance from said vehicle to said object for a particular set of input variables within an array of rows and columns;
- means for selectively reading the stored information from one of said memory matrices in response to said detected vehicle speed and to said detected magnitude of angular movement of said steering wheel as a set of said input variables;
- means for comparing the distance sensed by said radar device and the minimum allowable distance represented by the information read out from said one of the memory matrices to generate an inhibit signal when said sensed distance is greater than said allowable distance; and
- means for disabling said output signal from said decision making circuit in response to said inhibit signal.

5. A method for detecting a valid object from a roadway vehicle having a steering wheel, comprising:

- storing electrical quantities each representing a minimum allowable distance from said vehicle to an object for a given set of a speed of said vehicle relative to roadway and a magnitude of angular movement of said steering wheel in storage locations within an array of rows and columns;
- sensing the speed of the vehicle relative to said roadway;
- sensing the magnitude of angular movement of said steering wheel;
- sensing the distance from said vehicle to said object;
- relating said sensed vehicle speed and said distance to a particular location of said array of rows and column;
- addressing the storage location in response to the sensed vehicle speed and said sensed magnitude of steering wheel movement to read out the electrical quantity stored in the addressed location;
- sensing the speed of said vehicle relative to said object;
- determining whether said vehicle is approaching said object at a dangerously high speed in response to said sensed vehicle speed relative to said object and to said sensed distance;
- comparing the minimum allowable distance represented by the read out electrical quantity with said sensed distance; and
- judging that said determination is valid when said sensed distance is smaller than said minimum allowable distance.

* * * * *